United States Patent

Bay

[15] 3,659,585
[45] May 2, 1972

[54] TWO-PART ROASTING PAN

[72] Inventor: Eduard Bay, Hohlstrasse 26, Ransbach, Baumbach, Germany

[22] Filed: May 4, 1970

[21] Appl. No.: 34,241

[30] Foreign Application Priority Data

Jan. 17, 1970 Germany......................G 70 01 434.5

[52] U.S. Cl................................................126/390, 99/425
[51] Int. Cl. ........................................................A47j 37/00
[58] Field of Search ......................220/72, 83; 126/369, 390; 99/448, 426, 425; 106/45; D44/8.3, 8.33

[56] References Cited

UNITED STATES PATENTS

| 2,061,610 | 11/1936 | Burnette | 126/390 |
| 235,961 | 12/1880 | Praetorius | 106/45 |
| 2,765,728 | 10/1956 | Pearce | 126/390 X |
| 313,092 | 3/1885 | Mayes | 220/72 |
| 2,622,187 | 12/1952 | Welch | 126/390 UX |
| 2,875,683 | 3/1959 | Burns | 126/390 UX |

FOREIGN PATENTS OR APPLICATIONS

| 974,180 | 11/1964 | Great Britain | 220/72 |

Primary Examiner—Charles J. Myhre
Attorney—Singer, Stern & Carlberg

[57] ABSTRACT

A two-part roasting pan made of unglazed porous earthenware has the inner surface of its lower part, namely the bottom and the side walls thereof, provided with integral spaced parallel ribs which engage and support a roast placed in the roasting pan.

2 Claims, 3 Drawing Figures

Patented May 2, 1972  3,659,585

INVENTOR
Edward Bay
by Singer, Stern & Carlberg
ATTORNEYS

Patented May 2, 1972 3,659,585

INVENTOR.
Eduard Bay
BY Singer, Stern & Carlberg
ATTORNEYS

TWO-PART ROASTING PAN

The invention relates to a two-part ceramic roasting pan made of unglazed porous earthenware and comprising a hollow lower part and a curved upper part serving as a cover.

For the purpose of using the roasting pan of the invention, the pan is placed for some time in water so that the pores in the walls of the pan are filled by suction with water. This water in the pores is given off again from the pores during the heating operation so that the roast in the pan, for instance comprising a piece of meat, particularly poultry or fish is always being roasted in a humid atmosphere and does not dry out.

The roasting pan for the purpose of heating the same is introduced into a roasting oven so that all sides of the pan are heated uniformly.

The food in the roasting pan may be roasted without any basting or other manipulations and remains juicy.

Experience has shown that it is often unavoidable that the meat adheres to the inner wall and the bottom of the roasting pan. This injures often the outer surface of the meat and results in a poor appearance. One has proposed already the insertion of roasting bars on the bottom, but it was discovered that this alone is not sufficient to prevent an adherence of the meat at all places.

The object of the invention is a two-part roast-ing pan in which the adherence of the roast is avoided for all practical purposes.

In accordance with the invention the inner wall, including the bottom of the lower part of the roasting pan, is provided with projections and/or recesses for placing thereupon the roast.

The projections and recesses are produced during the molding of the roasting pan, so that any inserted roasting bars are eliminated.

The drawings illustrate by way of example two embodiments of the roasting pan of the invention.

Figure 1:
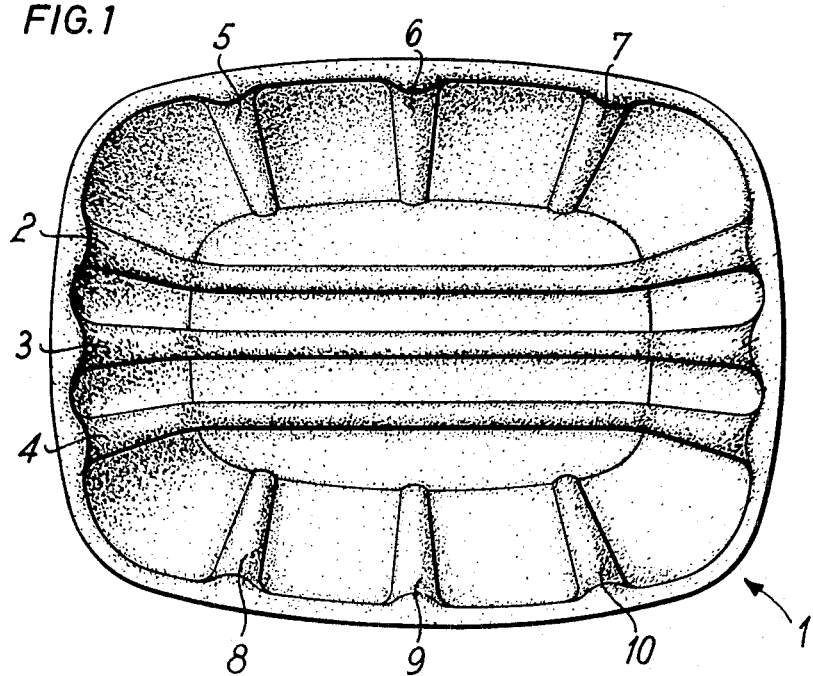
FIG. 1 is a top plan view of the lower part of a roasting pan.

Referring to FIG. 1, the lower part 1 of the hollow roasting pan made of unglazed porous earthenware is provided on its hollow inner face with substantially spaced parallel longitudinal ribs 2, 3 and 4 which extend continuously over the two short end walls and the bottom wall, while the two longer side walls are provided on their inner faces with transverse ribs 5, 6, 7 and 8, 9, and 10 respectively, the lower ends of which terminate at the perimeter of the substantially rectangular bottom wall.

Figure 2:
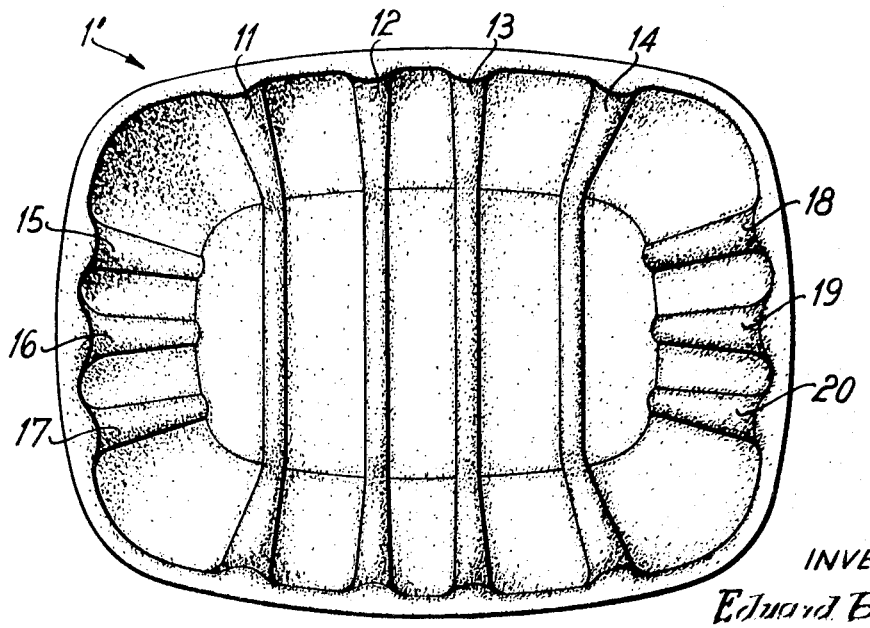
FIG. 2 is a top plan view of another embodiment of the lower part of a roasting pan.
Figure 3:
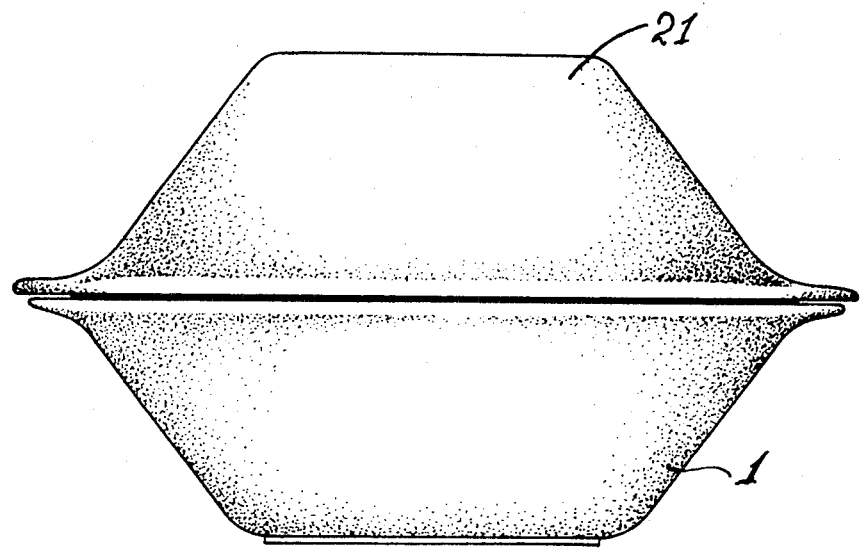
FIG. 3 is a side elevation view of a complete two-part roasting pan.

In the modified construction of the lower part 1' of the roasting pan illustrated in FIG. 2, the inner face of the roasting pan is provided with substantially spaced parallel transverse ribs 11, 12, 13 and 14, which extend continuously transversely over the longer side walls and over the bottom wall. The remaining shorter end walls are provided with three substantially spaced parallel ribs 15, 16, 17 and 18, 19, 20 respectively, extending from the outer edge of the roasting pan to the perimeter of the substantially rectangular bottom wall.

The ribs are preferably molded integrally with the bottom part of the roasting pan when the latter is shaped of the ceramic material forming the unglazed porous earthenware, so that no special roasting bars require to be inserted. The ribs are of such shape that grooves are formed in the inside wall of said lower part of the roasting pan.

In this manner the making of the lower part of the roasting pan is simplified and the cleaning thereof does not cause any difficulties.

The upper part or cover 21 of the roasting pan is preferably likewise made of unglazed porous earthenware, but may also be made of transparent heat resistant glass which permits an observation of the roast in the lower part 1 or 1'.

In accordance with the invention the roast for all practical purposes rests only on or engages only the ribs in the lower part of the roasting pan, so that a large surface adhering of the roast or the skin of the roast to the inner wall of the roasting pan is avoided.

What I claim is:

1. In a roasting utensil of unglazed porous earthenware, a pan-shaped lower part having a bottom surrounded by upstanding integral side walls, and a removable cover part supported on the upper rim of said side walls, said pan-shaped lower part being provided with a series of substantially parallel ribs integral therewith and extending across the bottom of said lower part and up said side walls at opposite edges of said lower part, and another series of spaced ribs integral with said side walls and extending from the bottom of said lower part to the upper rim of said side walls in a direction forming an angle with said firstmentioned series of ribs, whereby a roast placed in said lower part of the utensil rests upon and against at least a number of said ribs without closing the pores in the spaces between said ribs.

2. A roasting utensil as set forth in claim 1, in which said side walls are inclined outwardly from the bottom of said lower part, and said ribs on the side walls diverge slightly from the bottom toward the upper rim of said side walls.

* * * * *